(12) United States Patent
Miyake et al.

(10) Patent No.: US 10,914,963 B2
(45) Date of Patent: Feb. 9, 2021

(54) MACRO LENS AND IMAGE PICKUP APPARATUS USING THE SAME

(71) Applicant: OLYMPUS CORPORATION, Hachioji (JP)

(72) Inventors: Akiko Miyake, Hino (JP); Yuki Kubota, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 108 days.

(21) Appl. No.: 16/259,897

(22) Filed: Jan. 28, 2019

(65) Prior Publication Data
US 2020/0241388 A1     Jul. 30, 2020

(51) Int. Cl.
| | |
|---|---|
| *G02B 15/22* | (2006.01) |
| *G02B 9/60* | (2006.01) |
| *G02B 27/64* | (2006.01) |
| *G03B 13/36* | (2021.01) |
| *G03B 5/04* | (2021.01) |
| *G03B 5/02* | (2021.01) |
| *G02B 7/09* | (2021.01) |
| *H04N 5/225* | (2006.01) |
| *G02B 9/64* | (2006.01) |
| *G02B 15/14* | (2006.01) |
| *H04N 5/232* | (2006.01) |

(52) U.S. Cl.
CPC ............ *G02B 27/646* (2013.01); *G02B 7/09* (2013.01); *G02B 9/64* (2013.01); *G02B 15/1451* (2019.08); *G02B 15/22* (2013.01); *G03B 5/02* (2013.01); *G03B 5/04* (2013.01); *G03B 13/36* (2013.01); *H04N 5/2254* (2013.01); *G03B 2205/0015* (2013.01); *G03B 2205/0038* (2013.01); *H04N 5/23287* (2013.01)

(58) Field of Classification Search
None
See application file for complete search history.

(56) References Cited

U.S. PATENT DOCUMENTS

| | | |
|---|---|---|
| 7,864,451 B2 | 1/2011 | Taki |
| 9,632,289 B2 | 4/2017 | Tomioka et al. |
| 2010/0157445 A1* | 6/2010 | Taki ................... G02B 13/24 359/764 |

(Continued)

FOREIGN PATENT DOCUMENTS

| | | |
|---|---|---|
| JP | 2011048232 A | 3/2011 |
| JP | 5142823 B2 | 2/2013 |

(Continued)

*Primary Examiner* — Darryl J Collins
(74) *Attorney, Agent, or Firm* — Holtz, Holtz & Volek PC

(57) ABSTRACT

A macro lens includes an object-side lens unit having a positive refractive power, a first focusing lens unit having a negative refractive power, a second focusing lens unit having a positive refractive power, an aperture stop, an intermediate lens unit which includes a lens component having a positive refractive power, and a wobbling lens unit. The aperture stop and the intermediate lens unit are disposed between the first focusing lens unit and the second focusing lens unit, the aperture stop is adjacent to the lens component having a positive refractive power, and the following conditional expressions (1), (2), and (3) are satisfied:

$$2 < LEE/|\Delta fo1G| < 15 \quad (1)$$
$$2 < LEE/|\Delta fo2G| < 15 \quad (2)$$
$$0.5 < |MG| < 1.5 \quad (3).$$

13 Claims, 8 Drawing Sheets

(56) References Cited

U.S. PATENT DOCUMENTS

2012/0229913 A1* 9/2012 Hara .................. G02B 15/173
359/683
2015/0323764 A1* 11/2015 Mori ................ G02B 13/0045
348/360

FOREIGN PATENT DOCUMENTS

JP 5268619 B2 8/2013
JP 6219198 B2 10/2017

* cited by examiner

SA
FNO 2.853

AS
FIY 11.45

DT
FIY 11.45

CC
FIY 11.45

SA
FNO 2.770

AS
FIY 11.45

DT
FIY 11.45

CC
FIY 11.45

SA
FNO 1.879

AS
FIY 11.45

DT
FIY 11.45

CC
FIY 11.45

435.84 — — —
486.13 ———
656.27 - - - - -
587.56 ———

SA
FNO 2.848

-0.20  0.20
(mm)

AS
FIY 11.45

-0.20  0.20
(mm)

DT
FIY 11.45

-10.00  10.00
(%)

CC
FIY 11.45

-0.02  0.02
(mm)

SA
FNO 2.644

-0.20  0.20
(mm)

AS
FIY 11.45

-0.20  0.20
(mm)

DT
FIY 11.45

-10.00  10.00
(%)

CC
FIY 11.45

-0.02  0.02
(mm)

SA
FNO 1.704

-0.20  0.20
(mm)

AS
FIY 11.45

-0.20  0.20
(mm)

DT
FIY 11.45

-10.00  10.00
(%)

CC
FIY 11.45

-0.02  0.02
(mm)

MACRO LENS AND IMAGE PICKUP APPARATUS USING THE SAME

BACKGROUND OF THE INVENTION

Field of the Invention

The present invention relates to macro lens and an image pickup apparatus using the same.

Description of the Related Art

Macro lenses having a fixed overall length of an optical system and a favorable imaging performance have been disclosed in Japanese Patent Publication No. 5142823, Japanese Patent Publication No. 5268619, Japanese Patent Application Laid-open Publication No. 2011-048232, and Japanese Patent Publication No. 6219198. In these macro lenses, focusing from an object at infinity to an object at a close distance is possible. Here, the close distance is a distance in a macro area. The macro area is an area in which a magnification of image becomes an 1:1 magnification or an area in which the magnification of image becomes close to the equal magnification.

In Japanese Patent Publication No. 5142823, a macro lens having six lens units has been disclosed. The macro lens includes in order from an object side a lens unit having a positive refractive power, a lens unit having a negative refractive power, a lens unit having a positive refractive power, a lens unit having a positive refractive power, a lens unit having a negative refractive power, and a lens unit having a positive refractive power.

In Japanese Patent Publication No. 5268619, a macro lens having five lens units has been disclosed. The macro lens includes in order from an object side, a lens unit having a positive refractive power, a lens unit having a negative refractive power, a lens unit having a positive refractive power, a lens unit having a positive refractive power, and a lens unit having a negative refractive power.

In Japanese Patent Application Laid-open Publication No. 2011-048232, a macro lens having six lens units has been disclosed. The macro lens includes in order from an object side, a lens unit having a positive refractive power, a lens unit having a negative refractive power, a lens unit having a positive refractive power, a lens unit having a positive refractive power, a lens unit having a negative refractive power, and a lens unit having a weak refractive power.

In Japanese Patent Publication No. 6219198, a macro lens having six lens units has been disclosed. The macro lens includes in order from an object side, a lens unit having a positive refractive power, a lens unit having a negative refractive power, a lens unit having a positive refractive power, a lens unit having a positive refractive power, a lens unit having a positive refractive power, and a lens unit having a negative refractive power.

In macro photography, a still photography or a video photography is carried out. In the video photography, it is necessary to maintain a focused state all the time. In the video photography, a contrast autofocus (a so-called mountain-climbing type autofocus) is adopted.

In the contrast autofocus, a lens unit is made to move along an optical axis, and a variation in a contrast is measured. From the variation in the contrast, a variation in a focused state (shift from the focused state) is detected. Then, in a case in which a judgment has been made that the focused state is varied, by moving the lens unit appropriately, it is possible to make the focusing state to be focused state once again. As a result, even when a distance from the macro lens up to an object is varied, it is possible to continue to maintain the focused state all the time.

An operation of letting the lens unit to vibrate along the optical axis is called as wobbling. Moreover, a lens unit which is wobbled is called as a wobbling lens unit.

In a case in which an aberration fluctuates largely during wobbling, when a displayed image is viewed, the displayed image is seen to be wavering. Consequently, the displayed image is seen to be extremely unnatural. Therefore, in the video photography, it is significant that the fluctuation in aberration has been suppressed.

SUMMARY OF THE INVENTION

A macro lens according to at least some embodiments of the present invention comprises:

an object-side lens unit having a positive refractive power, a first focusing lens unit having a negative refractive power, a second focusing lens unit having a positive refractive power, an aperture stop which restricts an axial light beam, an intermediate lens unit which includes a lens component having a positive refractive power, and a wobbling lens unit, wherein the object-side lens unit is disposed nearest to an object, the first focusing lens unit is disposed on an image side of the object-side lens unit, the second focusing lens unit is disposed on the image side of the first focusing lens unit, the aperture stop and the intermediate lens unit are disposed between the first focusing lens unit and the second focusing lens unit, the aperture stop is adjacent to the lens component having a positive refractive power, at a time of focusing, a position of each of the object-side lens unit, the aperture stop, and the intermediate lens unit is fixed, in the first focusing lens unit, a position at a time of focusing to an object at a close distance is located on the image side with respect to a position at a time of focusing to an object at the longest distance, and in the second focusing lens unit, a position at the time of focusing to an object at a close distance is located on an object side with respect to a position at the time of focusing to an object at the longest distance, and the following conditional expressions (1), (2), and (3) are satisfied:

$$2 < LEE/|\Delta fo1G| < 15 \quad (1)$$

$$2 < LEE/|\Delta fo2G| < 15 \quad (2)$$

$$0.5 < |MG| < 1.5 \quad (3)$$

where, the lens component having a positive refractive power has only two air-contact surfaces, and $\Delta fo1G$ denotes a predetermined difference in the first focusing lens unit, $\Delta fo2G$ denotes a predetermined difference in the second focusing lens unit, LEE denotes a distance from a lens surface nearest to the object of the macro lens up to a lens surface nearest to an image of the macro lens at the time of focusing to an object at the longest distance, and MG denotes a shooting magnification at a close photographic distance, and here the predetermined difference is a difference between the position at the time of focusing to an object at the longest distance and the position at the time of focusing to an object at a close distance.

An image pickup apparatus according to at least some embodiments of the present invention comprises:

an optical system, and an image pickup element which has an image pickup surface, and which converts an image formed on the image pickup surface by the optical system to an electric signal, wherein the optical system is the abovementioned macro lens.

DETAILED DESCRIPTION OF THE INVENTION

Figure 1:
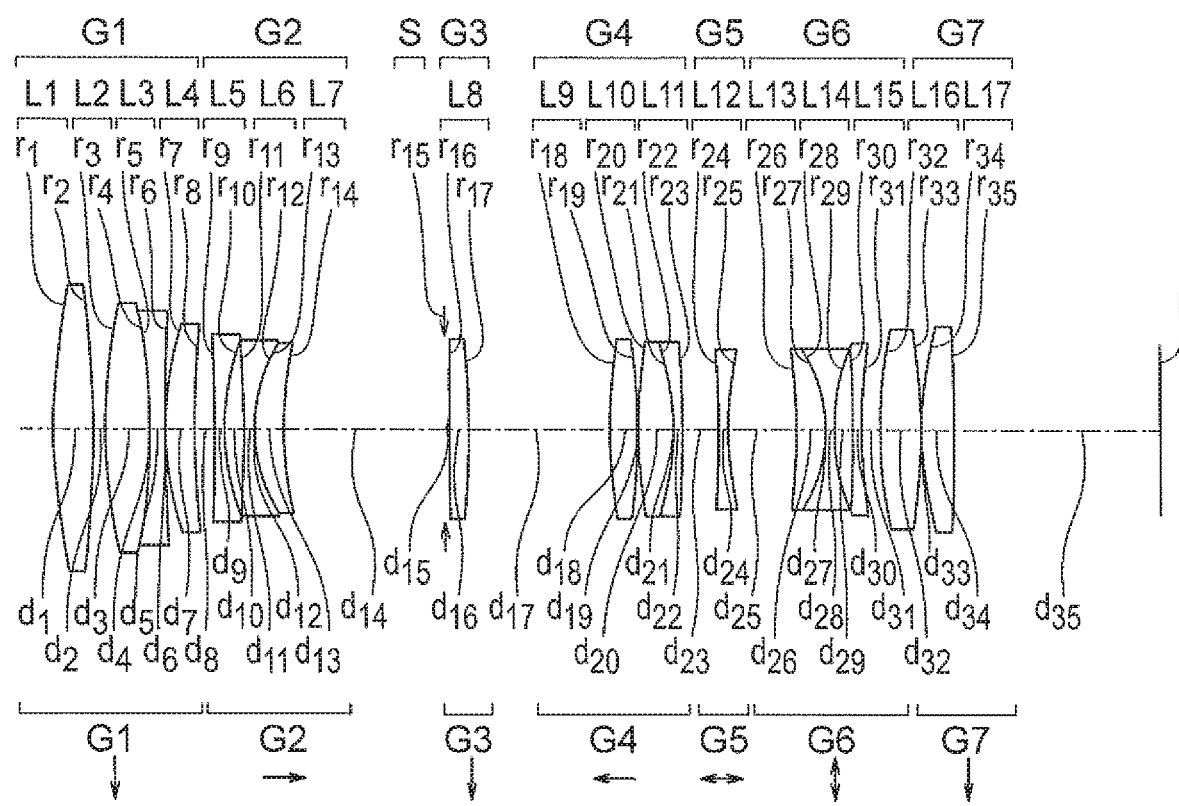
FIG. 1 is a lens cross-sectional view of a macro lens according to an example 1.

Prior to explaining examples, an action and an effect of an embodiment according to a certain aspect of the present invention will be described below. For describing specifically the action and an effect of the present embodiment, the description will be made by citing specific examples. However, similar to a case of the examples that will be described later, illustrative examples are only some of the illustrative examples included in the present invention, and there are various variations of these illustrative examples. Therefore, the present invention is not restricted to the illustrative examples that are exemplified.

A macro lens of the present embodiment includes an object-side lens unit having a positive refractive power, a first focusing lens unit having a negative refractive power, a second focusing lens unit having a positive refractive power, an aperture stop which restricts an axial light beam, an intermediate lens unit which includes a lens component having a positive refractive power, and a wobbling lens unit, wherein the object-side lens unit is disposed nearest to an object, the first focusing lens unit is disposed on an image side of the object-side lens unit, the second focusing lens unit is disposed on the image side of the first focusing lens unit, the aperture stop and the intermediate lens unit are disposed between the first focusing lens unit and the second focusing lens unit, the aperture stop is adjacent to the lens component having a positive refractive power, at a time of focusing, a position of each of the object-side lens unit, the aperture stop, and the intermediate lens unit is fixed, in the first focusing lens unit, a position at a time of focusing to an object at a close distance is located on the image side with respect to a position at a time of focusing to an object at the longest distance, in the second focusing lens unit, a position at the time of focusing to an object at a close distance is located on an object side with respect to a position at the time of focusing to an object at the longest distance, and the following conditional expressions (1), (2), and (3) are satisfied:

$$2 < LEE/|\Delta fo1G| < 15 \quad (1)$$

$$2 < LEE/|\Delta fo2G| < 15 \quad (2)$$

$$0.5 < |MG| < 1.5 \quad (3)$$

where, the lens component having a positive refractive power has only two air-contact surfaces, and $\Delta fo1G$ denotes a predetermined difference in the first focusing lens unit, $\Delta fo2G$ denotes a predetermined difference in the second focusing lens unit, LEE denotes a distance from a lens surface nearest to the object of the macro lens up to a lens surface nearest to an image of the macro lens at the time of focusing to an object at the longest distance, and MG denotes a photographic magnification at a close photographic distance, and here the predetermined difference is a difference between the position at the time of focusing to an object at the longest distance and the position at the time of focusing to an object at a close distance.

The macro lens of the present embodiment includes the object-side lens unit having a positive refractive power, the first focusing lens unit having a negative refractive power, the second focusing lens unit having a positive refractive power, the aperture stop which restricts the axial light beam, the intermediate lens unit which includes the lens component having a positive refractive power, and the wobbling lens unit.

The wobbling lens unit vibrates along an optical axis in a predetermined range. The predetermined range is narrower than both a range of movement of the first focusing lens unit and a range of movement of the second focusing lens unit. By the macro lens including the wobbling lens unit, it is possible to form a sharp optical image in a video photography in particular.

In the macro lens of the present embodiment, the object-side lens unit is fixed at the time of focusing. The object-side lens unit is positioned nearest to the object. In this case, since a lens unit positioned nearest to the object in the optical system is fixed, it is possible to seal the optical system by this lens unit. Consequently, it is possible to prevent dirt and dust from entering into the optical system.

Moreover, when such an arrangement is made, it is possible to reduce a leakage of a driving sound of a focusing operation at a time of video photography. Accordingly, fixing the object-side lens unit is advantageous for reducing a sound noise.

Furthermore, when the lens unit positioned nearest to the object moves at the time of focusing, the object and the lens unit come in contact or hit each other. In macro photography in particular, since a distance from the object is short, a contact with the object or hitting the object is susceptible to occur. By fixing the object-side lens unit, an overall length of the optical system becomes constant all the time. Consequently, it is possible to prevent the contact with the object or hitting the object at the time of focusing.

The object-side lens unit may be fixed even at a time of wobbling or at a time of correcting the motion blur.

The macro lens of the present embodiment includes the first focusing lens unit and the second focusing lens unit. The first focusing lens unit is disposed on the image side of the object-side lens unit, and the second focusing lens unit is disposed on the image side of the first focusing lens unit. By providing a plurality of focusing lens unit, it is easy to shorten the overall length of the optical system while improving a magnification (absolute value) at the time of close-distance photography.

The aperture stop and the intermediate lens unit are disposed between the first focusing lens and the second focusing lens.

When such arrangement is made, the aperture stop is disposed at almost center of the macro lens. Consequently, it is possible to suppress an overall size of the macro lens from becoming large even when an F-number is made small.

Moreover, since the lens component having a positive refractive power is disposed in the intermediate lens unit, it is possible to make a diameter of a light beam small on the image side of the intermediate lens unit.

The second focusing lens unit is disposed on the image side of the intermediate lens unit. Therefore, a diameter of a light beam incident on the second focusing lens unit becomes small. When the diameter of the light beam incident on the second focusing lens unit is small, it is possible to make the second focusing lens unit small-sized. As a result, it is possible to move the second focusing lens unit at a high speed.

The intermediate lens unit includes the lens component having a positive refractive power. The aperture stop is adjacent to the lens component having a positive refractive power. The lens component has two air-contact surfaces. Moreover, in the lens component, at least one air-contact surface is a curved surface. The lens component includes a single lens and a cemented lens for instance.

At the time of focusing, the aperture stop and the intermediate lens unit are fixed. By fixing the aperture stop at the time of focusing, it is possible to reduce an aberration fluctuation at the time of focusing.

The conditional expression (1) is a conditional expression which specifies a preferable amount of movement of the first focusing lens unit. The conditional expression (2) is a conditional expression which specifies a preferable amount of movement of the second focusing lens unit.

Both in a case in which a value does not fall below a lower limit value of conditional expression (1) and in a case in which a value does not fall below a lower limit value of conditional expression (2), it is possible to suppress both an increase in the amount of movement of the first focusing lens unit and an increase in the amount of movement of the second focusing lens unit. As a result, it is possible to shorten an overall length of the macro lens and also it becomes easy to suppress both an aberration fluctuation that occurs due to the movement of the first focusing lens unit and an aberration fluctuation that occurs due to the movement of the second focusing lens unit.

Both in a case in which a value does not exceed an upper limit value of conditional expression (1) and in a case in which a value does not exceed an upper limit value of conditional expression (2), it is possible to secure both the amount of movement of the first focusing lens unit and the amount of movement of the second focusing lens unit. Consequently, it is possible to shorten the overall length of the macro lens at the time of focusing to an object at a close distance.

By satisfying both of conditional expressions (1) and (2) simultaneously, it is possible to make the macro lens small-sized while suppressing an aberration fluctuation.

The conditional expression (3) is a conditional expression which specifies a photographic magnification at a close photographic distance. The close photographic distance is a distance at which a distance between the object and the macro lens becomes the minimum. By satisfying conditional expression (3), it is possible to form an optical image with an appropriate magnification while shortening the overall length of the macro lens.

In a case in which a value does not exceed an upper limit value of conditional expression (3), it is possible to suppress an increase in an amount of movement of a focusing lens. As a result, it is possible to shorten the overall length of the macro lens. In a case in which a value does not fall below a lower limit value of conditional expression (3), by increasing the photographic magnification, it is possible to secure the photographic magnification which is significant for the macro lens.

In the macro lens of the present embodiment, it is preferable that the wobbling lens unit have a negative refractive power.

In a case in which the fluctuation in aberration is large during wobbling, an image displayed, when a displayed image is viewed, the displayed image is seen to be wavering. Consequently, the displayed image is seen to be extremely unnatural. Therefore, in the video photography, it is significant to make small the aberration fluctuation at the time of wobbling. By letting the wobbling lens unit to have a negative refractive power, it is possible to suppress the fluctuation in aberration at the time of wobbling.

In the macro lens of the present embodiment, it is preferable that the wobbling lens unit be disposed on the image side of the second focusing lens unit.

An extremely high speed movement is necessary for the movement of the wobbling lens unit. Therefore, the wobbling lens unit is sought to be made light-weight and to have the minimum amount of movement.

Moreover, when the wobbling is carried out, a driving sound (operation sound) is generated due to the movement of the wobbling lens unit. When a volume of the driving sound is high, the driving noise is recorded as a noise with other sound in the video photography. Therefore, a reduction of the volume of the driving sound also becomes a significant issue.

For solving issues such as the abovementioned issue and to meet the requirement, a reduction in weight has been sought for the wobbling lens particularly.

The lens component having a positive refractive power is disposed in the intermediate lens unit. Moreover, the second focusing lens unit has a positive refractive power. Consequently, it is possible to make a diameter of a light beam small on the image side of the intermediate lens unit.

The wobbling lens unit is disposed on the image side of the second focusing lens unit. Therefore, a diameter of a light beam incident on the wobbling lens unit becomes small. When the diameter of the light beam incident on the wobbling lens unit is small, it is possible to make the wobbling lens unit small-sized and light-weight. As a result, it is possible to move the wobbling lens unit at a high speed.

In the macro lens of the present embodiment, it is preferable that the following conditional expression (4) be satisfied:

$$0 < Dw/FLinf < 0.017 \quad (4)$$

where,

Dw denotes a thickness of the wobbling lens unit on an optical axial, and

FLinf denotes a focal length of the macro lens at the time of focusing to an object at the longest distance.

By satisfying conditional expression (4), it is possible to achieve both of shortening of an overall length of the wobbling lens unit and shortening of the overall length of the macro lens.

In the macro lens of the present embodiment, it is preferable that the following conditional expression (5) be satisfied:

$$1.82 < FLap/FLinf < 2.17 \quad (5)$$

where,

FLap denotes a focal length of the intermediate lens unit, and

FLinf denotes the focal length of the macro lens at the time of focusing to an object at the longest distance.

By satisfying conditional expression (5), it is possible to let a refractive power of the intermediate lens unit to be appropriate magnitude. As a result, it is possible to make small a light-beam diameter on the image side of the intermediate lens unit, while suppressing an occurrence of aberration in the intermediate lens unit.

In the macro lens of the present embodiment, it is preferable that the object-side lens unit include in order from the object side, a single lens having a positive refractive power, a single lens having a positive refractive power, a single lens having a negative refractive power, and a single lens having a positive refractive power.

By making such arrangement, it is possible to reduce various aberrations both at the time of focusing to an object at the longest distance and at the time of focusing to an object at a close distance, while securing a large positive refractive power in the object-side lens unit. By the object-side lens unit including a plurality of lenses, since it is possible to make gentle a refraction of a light ray in the object-side lens unit, it is possible to suppress an occurrence of aberration. Furthermore, by the single lens having a positive refractive power and the single lens having negative refractive power, it is possible to correct a chromatic aberration effectively.

In the macro lens of the present embodiment, it is preferable that the first focusing lens unit include in order from the object side, a single lens having a negative refractive power and a cemented lens, and the cemented lens includes a single lens having a negative refractive power and a single lens having a positive refractive power.

The first focusing lens unit is sought to be light-weight as well as to reduce the aberration fluctuation at the time of focusing operation. A fact that the first focusing lens unit includes the single lens having a negative refractive power and the single lens having a positive refractive power is advantageous for making the first focusing lens unit light-weight and reducing the aberration fluctuation in the first focusing lens unit.

A fact that the first focusing lens unit included the single lens having a negative refractive power and the cemented lens is advantageous for reduction of aberration. The cemented lens includes in order from the object side the single lens having a negative refractive power and the single lens having a positive refractive power. By making such arrangement, it is possible to correct an aberration favorably.

In the macro lens of the present embodiment, it is preferable that the second focusing lens unit include in order from the object side, a single lens having a positive refractive power and a cemented lens, and the cemented lens includes a single lens having a positive refractive power and a single lens having a negative refractive power.

The second focusing lens unit is sought to be light-weight as well as to reduce the aberration fluctuation at the time of focusing operation. A fact that the second focusing lens unit includes the single lens having a positive refractive power and the single lens having a positive refractive power is advantageous for making the second focusing lens unit light-weight and reducing the aberration fluctuation in the second focusing lens unit.

At a position of a lens nearest to the object in the second focusing unit, a diameter of a lens is susceptible to become large. Therefore, by letting the lens nearest to the object to be the single lens having a positive refractive power, it is possible to make small a volume of the lens nearest to the object. Accordingly, making such arrangement is advantageous for making the second focusing lens unit light-weight.

In the macro lens of the present embodiment, it is preferable that the wobbling lens unit include a single lens having a negative refractive power.

By making such arrangement, it is possible to make the wobbling lens unit light-weight while functioning as a wobbling lens unit.

It is preferable that the macro lens of the present embodiment includes a motion blur correction lens unit having a negative refractive power, and the motion blur correction lens unit is disposed on the image side of the wobbling lens unit.

The intermediate lens unit and the second focusing lens unit are disposed on the object side of the wobbling lens unit. Since the intermediate lens unit and the second focusing lens unit have a positive refractive power, a diameter of a light beam becomes small on the image side of the second focusing lens unit. When the motion blur correction lens unit is disposed on the image side of the second focusing lens unit, it is possible to make small a diameter of a light beam incident on the motion blur correction lens unit.

The wobbling lens unit is disposed on the object side of the motion blur correction lens unit. However, since the diameter of the light beam incident on the wobbling lens unit has become small, the diameter of the light beam incident on the motion blur correction lens unit also does not become large.

Therefore, by disposing the motion blur correction lens unit on the image side of the wobbling lens unit, it is possible to make a diameter of the motion blur correction lens unit small. When the diameter of the motion blur correction lens unit is small, it becomes easy to carry out drive and control of the motion blur correction lens unit. As a result, it becomes easy to carry out motion blur correction.

In the macro lens of the present embodiment, it is preferable that the motion blur correction lens unit includes in order from the object side, a cemented lens and a single lens having a negative refractive power, and the cemented lens includes a lens having a positive refractive power and a lens having a negative refractive power.

The motion blur correction lens unit moves in a direction perpendicular to an optical axis. Therefore, it is preferable that the motion blur correction lens unit be light-weight. A fact that the cemented lens and the single lens having a negative refractive power is used in the motion blur correction lens unit is advantageous not only for making the motion blur correction lens unit light-weight and to secure an appropriate motion blur correction sensitivity but also for reduction of aberration.

In the macro lens of the present embodiment, it preferable that an image-side lens unit be disposed on an image side of the motion blur correction lens unit, and the image-side lens unit include two single lenses having a positive refractive power.

By the image-side lens unit including a plurality of lenses, it is possible to refract an off-axis light ray in the image-side lens unit little by little. Making such arrangement is advantageous for realizing a macro lens which is telecentric on the image side. In a telecentric optical system, it is possible to make an angle of incidence on an image pickup element small. Therefore, making the macro lens a telecentric optical system on the image side is advantageous for reduction of chromatic shading.

As mentioned above, in the macro lens of the present embodiment, since the object-side lens unit is fixed at the time of focusing, it is preferable that the image-side lens unit be fixed at the time of focusing. The object-side lens unit is positioned nearest to the object and the image-side lens unit is positioned nearest to the image. In this case, since lens units positioned on both sides of the optical system are fixed, it is possible to seal the optical system by these lens units. Consequently, it is possible to prevent dirt and dust from entering into the optical system.

Moreover, when such arrangement is made, it is possible to reduce the leakage of the driving sound of the focusing operation at the time of video photography. Accordingly, a fact that the object-side lens unit and the image-side lens unit are fixed is advantageous for reduction of the sound noise.

The image-side lens unit may be fixed even at the time of wobbling and at the time of motion blur correction.

An image pickup apparatus of the present embodiment includes an optical system, and an image pickup element which has an image pickup surface, and which converts an image formed on the image pickup surface by the optical system to an electric signal, and the optical system is the macro lens of the embodiment mentioned above.

According to the image pickup apparatus of the present embodiment, it is possible to achieve a high quality image without blur.

It is preferable to satisfy the plurality of abovementioned arrangements mutually. Moreover, an arrangement may be made such that some arrangements are satisfied simultaneously. For instance, in any of the abovementioned macro lenses, any of another macro lenses mentioned above may be used.

Regarding conditional expressions, each conditional expression may be let to be satisfied separately. When such arrangement is made, since it is easy to achieve respective effects, it is preferable.

For each conditional expression, a lower limit value and an upper limit value may be changed as follows. By doing so, since it is possible to have an effect of each conditional expression even more assuredly, it is preferable.

For conditional expression (1), it is more preferable to let the lower limit value to be 4.0, and 6.0.

For conditional expression (1), it is more preferable to let the upper limit value to be 13, and 11.

For conditional expression (2), it is more preferable to let the lower limit value to be 3.0, and 4.0.

For conditional expression (2), it is more preferable to let the upper limit value to be 13, and 10.

For conditional expression (3), it is more preferable to let the lower limit value to be 0.6, and 0.7.

For conditional expression (3), it is more preferable to let the upper limit value to be 1.4, and 1.3.

Examples of the macro lens will be described below in detail by referring to the accompanying diagrams. However, the present invention is not restricted to the examples described below.

Figure 2:
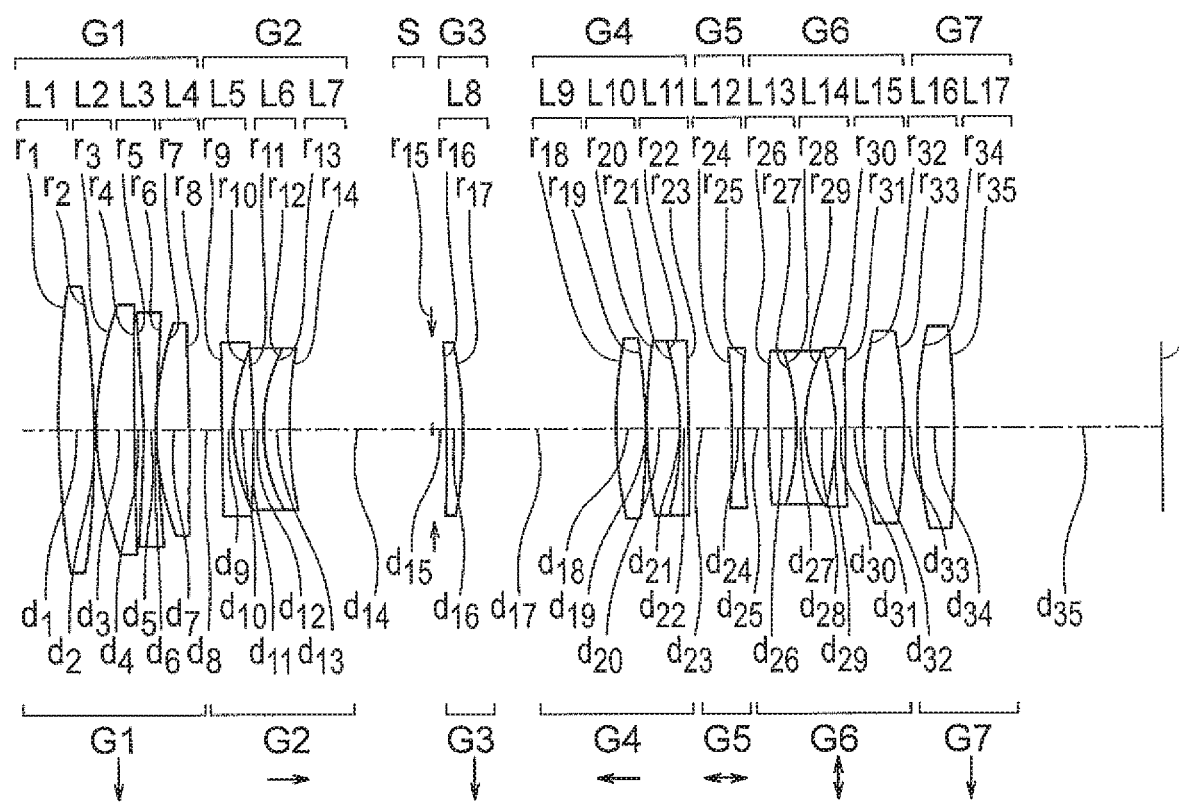
FIG. 2 is a lens cross-sectional view of a macro lens according to an example 2.

FIG. 1 and FIG. 2 show lens cross-sectional views at the time of focusing to an object at infinity.

Figure 3A:
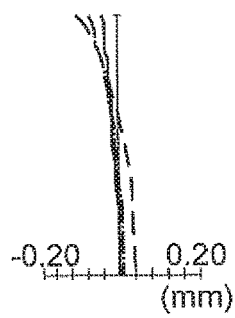
FIG. 3A, FIG. 3B, FIG. 3C, FIG. 3D, FIG. 3E, FIG. 3F, FIG. 3G, FIG. 3H, FIG. 3I, FIG. 3J, FIG. 3K, and FIG. 3L are lens aberration diagrams of the macro lens according to the example 1.
Figure 3B:
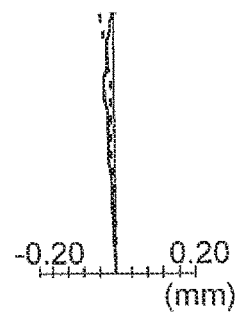
Figure 3C:
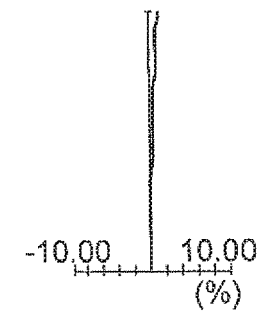
Figure 3D:
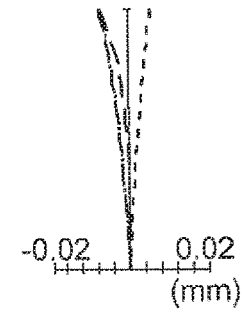
Figure 4A:
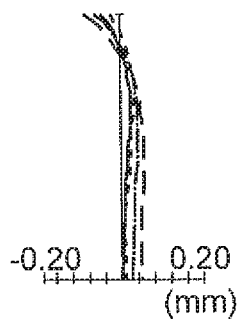
FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are lens aberration diagrams of the macro lens according to the example 2.
Figure 4B:
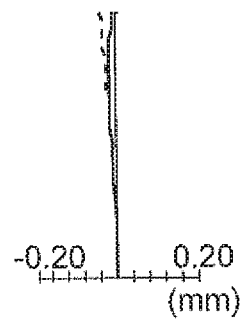
Figure 4C:
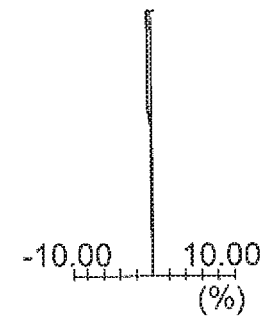
Figure 4D:
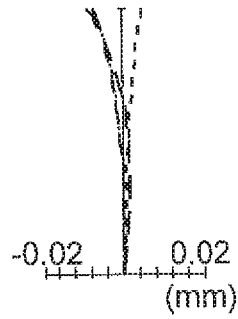

Aberration diagrams of each example will be described below. FIG. 3A and FIG. 4A show a spherical aberration (SA) at the time of focusing to an object at infinity, FIG. 3B and FIG. 4B show an astigmatism (AS) at the time of focusing to an object at infinity, FIG. 3C and FIG. 4C show a distortion (DT) at the time of focusing to an object at infinity, and FIG. 3D and FIG. 4D show a chromatic aberration of magnification (CC) at the time of focusing to an object at infinity.

Figure 3E:
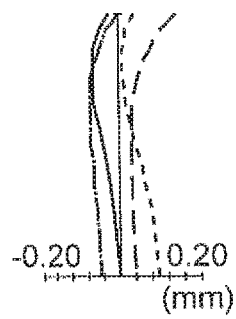
Figure 3F:
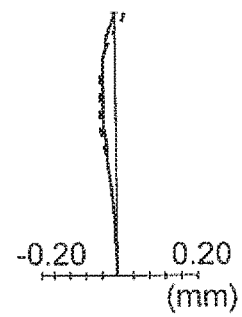
Figure 3G:
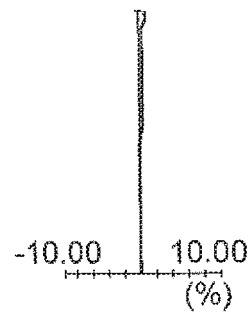
Figure 3H:
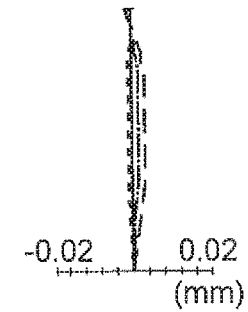
Figure 4E:
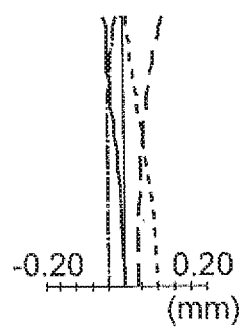
Figure 4F:
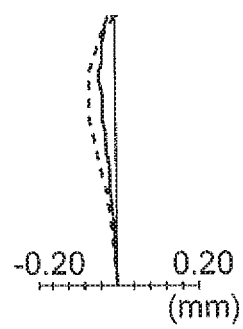
Figure 4G:
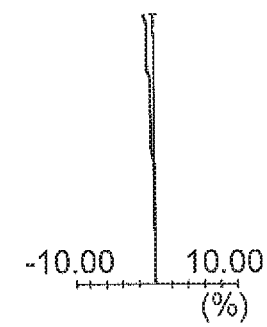
Figure 4H:
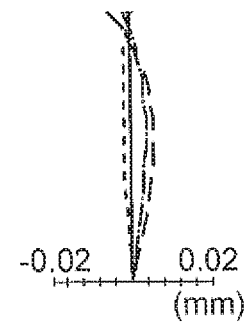

FIG. 3E and FIG. 4E show a spherical aberration (SA) at the time of focusing to an object at a first close distance, FIG. 3F and FIG. 4F show an astigmatism (AS) at the time of focusing to an object at a first close distance, FIG. 3G and FIG. 4G show a distortion (DT) at the time of focusing to an object at a first close distance, and FIG. 3H and FIG. 4H show a chromatic aberration of magnification (CC) at the time of focusing to an object at a first close distance.

Figure 3I:
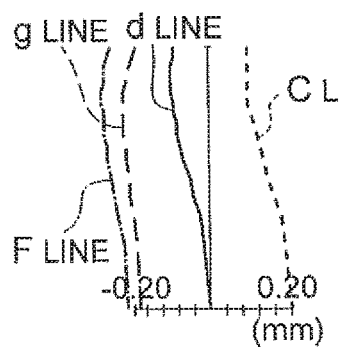
Figure 3J:
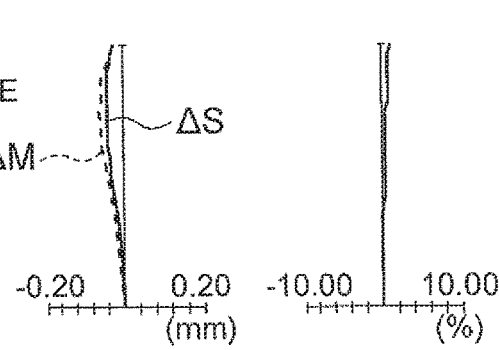
Figure 3K:
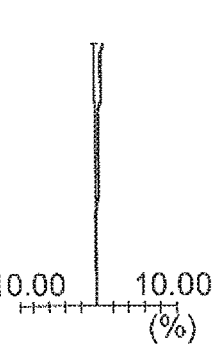
Figure 3L:
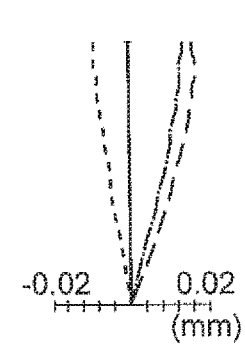
Figure 4I:
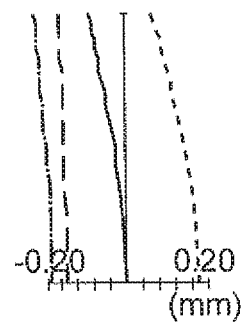
Figure 4J:
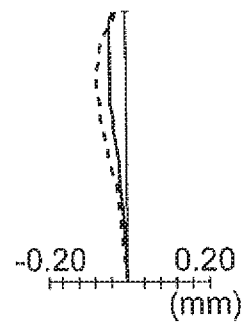
Figure 4K:
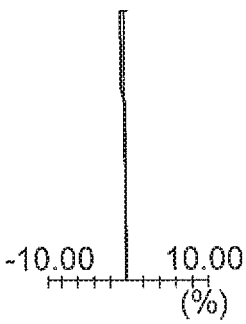
Figure 4L:
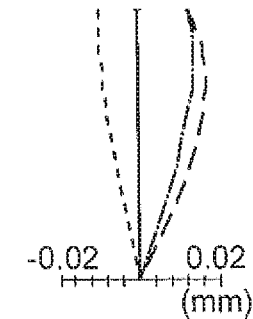

FIG. 3I and FIG. 4I show a spherical aberration (SA) at the time of focusing to an object at a second close distance, FIG. 3J and FIG. 4J show an astigmatism (AS) at the time of focusing to an object at a second close distance, FIG. 3K and FIG. 4K show a distortion (DT) at the time of focusing to an object at a second close distance, and FIG. 3L and FIG. 4L show a chromatic aberration of magnification (CC) at the time of focusing to an object at a second close distance.

At the time of focusing to an object at the first close distance means at a time of focusing to an object which locates at a position where the photographic magnification is 0.5 times, and at the time of focusing to an object at the second close distance means at a time of focusing to an object which locates at a position where the photographic magnification is 1 times.

In the following description, G1 denotes a first lens unit, G2 denotes a second lens unit, G3 denotes a third lens unit, G4 denotes a fourth lens unit, G5 denotes a fifth lens unit, G6 denotes a sixth lens unit, G7 denotes a seventh lens unit, S denotes an aperture stop, and I denotes an image plane (image pickup surface).

A macro lens of an example 1 includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, a sixth lens unit G6 having a negative refractive power, and a seventh lens unit G7 having a positive refractive power.

The first lens unit G1 includes a biconvex positive lens L1, a biconvex positive lens L2, a biconcave negative lens L3, and a positive meniscus lens L4 having a convex surface directed toward the object side.

The second lens unit G2 includes a biconcave negative lens L5, a biconcave negative lens L6, and a positive meniscus lens L7 having a convex surface directed toward the object side. Here, the biconcave negative lens L6 and the positive meniscus lens L7 are cemented.

The third lens unit G3 includes a positive meniscus lens L8 having a convex surface directed toward an image side.

The fourth lens unit G4 includes a biconvex positive lens L9, a biconvex positive lens L10, and a negative meniscus lens L11 having a convex surface directed toward the image side. Here, the biconvex positive lens L10 and the negative meniscus lens L11 are cemented.

The fifth lens unit G5 includes a biconcave negative lens L12.

The sixth lens unit G6 includes a positive meniscus lens L13 having a convex surface directed toward the image side, a biconcave negative lens L14, and a biconcave negative lens L15. Here, the positive meniscus lens L13 and the biconcave negative lens L14 are cemented.

The seventh lens unit G7 includes a biconvex positive lens L16 and a biconvex positive lens L17.

An aperture stop S is disposed between the second lens unit G2 and the third lens unit G3. More specifically, the aperture stop S is disposed adjacent to the positive meniscus lens L8, on the object side of the positive meniscus lens L8.

At the time of focusing from an object at the longest distance to an object at a close distance, the first lens unit G1, the third lens unit G3, the fifth lens unit G5, the sixth lens unit G6, and the seventh lens unit G7 are fixed, the second lens unit G2 moves toward the image side, and the fourth lens unit G4 moves toward the object side.

At the time of wobbling, the fifth lens unit G5 oscillates in a minute range in an optical axial direction. At the time of motion blur correction, the sixth lens unit G6 oscillates in a minute range in a direction orthogonal to the optical axial direction.

A macro lens of an example 2 includes in order from an object side, a first lens unit G1 having a positive refractive power, a second lens unit G2 having a negative refractive power, a third lens unit G3 having a positive refractive power, a fourth lens unit G4 having a positive refractive power, a fifth lens unit G5 having a negative refractive power, a sixth lens unit G6 having a negative refractive power, and a seventh lens unit G7 having a positive refractive power.

The first lens unit G1 includes a biconvex positive lens L1, a biconvex positive lens L2, a biconcave negative lens L3, and a biconvex positive lens L4.

The second lens unit G2 includes a biconcave negative lens L5, a biconcave negative lens L6, and a positive meniscus lens L7 having a convex surface directed toward the object side. Here, the biconcave negative lens L6 and the positive meniscus lens L7 are cemented.

The third lens unit G3 includes a positive meniscus lens L8 having a convex surface directed toward an image side.

The fourth lens unit G4 includes a biconvex positive lens L9, a biconvex positive lens L10, and a negative meniscus lens L11 having a convex surface directed toward the image side. Here, the biconvex positive lens L10 and the negative meniscus lens L11 are cemented.

The fifth lens unit G5 includes a biconcave negative lens L12.

The sixth lens unit G6 includes a biconvex positive lens L13, a biconcave negative lens L14, and a biconcave negative lens L15. Here, the biconvex positive lens L13 and the biconcave negative lens L14 are cemented.

The seventh lens unit G7 includes a biconvex positive lens L16 and a biconvex positive lens L17.

An aperture stop S is disposed between the second lens unit G2 and the third lens unit G3. More specifically, the aperture stop S is disposed adjacent to the positive meniscus lens L8, on the object side of the positive meniscus lens L8.

At the time of focusing from an object at the longest distance to an object at a close distance, the first lens unit G1, the third lens unit G3, the fifth lens unit G5, the sixth lens unit G6, and the seventh lens unit G7 are fixed, the second lens unit G2 moves toward the image side, and the fourth lens unit G4 moves toward the object side.

At the time of wobbling, the fifth lens unit G5 oscillates in a minute range in an optical axial direction. At the time of motion blur correction, the sixth lens unit G6 oscillates in a minute range in a direction orthogonal to the optical axial direction.

Numerical data of each example described above is shown below. In Surface data, r denotes radius of curvature of each lens surface, d denotes a distance between respective lens surfaces, nd denotes a refractive index of each lens for a d-line and vd denotes an Abbe number for each lens.

In various data, infinity indicates at the time of focusing to an object at infinity, a close 1 indicates at the time of focusing to an object which locates at a position where the photographic magnification is 0.5 times, and a close 2 indicates at the time of focusing to an object which locates at a position where the photographic magnification is 1 times.

Moreover, OB denotes an object distance, f denotes a focal length of an overall system, FNO denotes an F-number, NAin denotes a numerical aperture on a incidence side, ω denotes a half angle of view, BF denotes a back focus, LTL denotes an overall length of the optical system, IH denotes an image height, max denotes the maximum magnification, lonear denotes a distance from an object at the time of focusing to an object at a close distance up to an image plane. The back focus is expressed by air-converting a distance from a lens surface nearest to image up to a paraxial image plane. The overall length is a length obtained by adding the back focus to a distance from a lens surface nearest to object up to the lens surface nearest to image.

Further, in Unit focal length, each of f1, f2 . . . is a focal length of each lens unit.

Example 1

Unit mm

Surface data

| Surface no. | r | d | nd | vd |
|---|---|---|---|---|
| Object plane | ∞ | ∞ | | |
| 1 | 94.525 | 5.42 | 1.78590 | 44.20 |
| 2 | −147.780 | 1.66 | | |
| 3 | 72.356 | 6.00 | 1.49700 | 81.54 |
| 4 | −74.014 | 0.26 | | |
| 5 | −70.340 | 1.80 | 1.80000 | 29.84 |
| 6 | 311.675 | 0.15 | | |
| 7 | 46.351 | 4.03 | 1.49700 | 81.54 |
| 8 | 179.178 | Variable | | |
| 9 | −293.699 | 1.50 | 1.61800 | 63.40 |
| 10 | 32.214 | 2.58 | | |
| 11 | −208.575 | 1.30 | 1.72047 | 34.71 |
| 12 | 20.687 | 0.01 | 1.56384 | 60.67 |
| 13 | 20.687 | 4.14 | 1.80810 | 22.76 |
| 14 | 66.434 | Variable | | |
| 15 (Stop) | ∞ | 0.63 | | |
| 16 | −998.602 | 2.83 | 1.48749 | 70.23 |
| 17 | −82.031 | Variable | | |
| 18 | 62.385 | 3.79 | 1.69680 | 55.53 |
| 19 | −70.642 | 0.15 | | |
| 20 | 72.070 | 4.63 | 1.61800 | 63.40 |
| 21 | −34.539 | 0.01 | 1.56384 | 60.67 |
| 22 | −34.539 | 1.30 | 1.85478 | 24.80 |
| 23 | −170.763 | Variable | | |
| 24 | −129.298 | 1.20 | 1.68893 | 31.07 |
| 25 | 51.629 | Variable | | |
| 26 | −60.327 | 3.83 | 1.80810 | 22.76 |

-continued

Unit mm

| | | | | |
|---|---|---|---|---|
| 27 | −19.921 | 0.01 | 1.56384 | 60.67 |
| 28 | −19.921 | 1.20 | 1.62230 | 53.17 |
| 29 | 30.728 | 2.54 | | |
| 30 | −185.329 | 1.20 | 1.85478 | 24.80 |
| 31 | 94.973 | Variable | | |
| 32 | 74.693 | 5.37 | 1.78590 | 44.20 |
| 33 | −84.211 | 0.15 | | |
| 34 | 55.425 | 4.38 | 1.78800 | 47.37 |
| 35 | −204.302 | Variable | | |
| Image plane | ∞ | | | |

Various data

| | Infinity | Close 1 | Close 2 |
|---|---|---|---|
| OB | ∞ | 176.0 | 110.0 |
| f | 88.20 | 100.85 | 100.05 |
| FNO. | 2.85 | 2.77 | 1.88 |
| NAin | | 0.063 | 0.092 |
| 2ω | 13.84 | 8.48 | 4.22 |
| BF (in air) | 28.22 | 28.22 | 28.22 |
| LTL (in air) | 150.43 | 150.43 | 150.43 |
| IH | 10.815 | | |
| βmax | −1.0 | | |
| IOnear | 260.43 | | |
| d8 | 2.51 | 8.73 | 16.46 |
| d14 | 21.67 | 15.47 | 7.80 |
| d17 | 19.17 | 10.72 | 3.04 |
| d23 | 5.00 | 13.43 | 21.05 |
| d25 | 9.30 | 9.30 | 9.30 |
| d31 | 2.50 | 2.50 | 2.50 |
| d35 | 28.22 | 28.22 | 28.22 |

Unit focal length

| | | | |
|---|---|---|---|
| f1 = −48.12 | f2 = −29.35 | f3 = 183.15 | f4 = 36.50 |
| f5 = −53.41 | f6 = −25.16 | f7 = 27.25 | |

Example 2

Unit mm

Surface data

| Surface no. | r | d | nd | νd |
|---|---|---|---|---|
| Object plane | ∞ | ∞ | | |
| 1 | 129.999 | 5.04 | 1.85150 | 40.78 |
| 2 | −125.302 | 0.25 | | |
| 3 | 46.296 | 5.33 | 1.49700 | 81.54 |
| 4 | −12942.696 | 1.14 | | |
| 5 | −129.685 | 1.80 | 1.85478 | 24.80 |
| 6 | 136.518 | 0.15 | | |
| 7 | 47.626 | 4.21 | 1.49700 | 81.54 |
| 8 | −788.051 | Variable | | |
| 9 | −461.447 | 1.50 | 1.69680 | 55.53 |
| 10 | 28.426 | 2.63 | | |
| 11 | −136.620 | 1.30 | 1.72047 | 34.71 |
| 12 | 21.767 | 0.01 | 1.56384 | 60.67 |
| 13 | 21.767 | 3.41 | 1.92286 | 20.88 |
| 14 | 56.668 | Variable | | |
| 15 (Stop) | ∞ | 1.80 | | |
| 16 | −134.534 | 2.32 | 1.48749 | 70.23 |
| 17 | −54.371 | Variable | | |
| 18 | 64.396 | 3.94 | 1.69680 | 55.53 |
| 19 | −66.582 | 0.15 | | |
| 20 | 66.457 | 4.49 | 1.61800 | 63.40 |
| 21 | −38.948 | 0.01 | 1.56384 | 60.67 |
| 22 | −38.948 | 1.30 | 1.85478 | 24.80 |
| 23 | −322.116 | Variable | | |
| 24 | −93.940 | 1.20 | 1.72825 | 28.46 |
| 25 | 112.723 | Variable | | |
| 26 | 127.200 | 3.67 | 1.80810 | 22.76 |
| 27 | −36.159 | 0.01 | 1.56384 | 60.67 |
| 28 | −36.159 | 1.20 | 1.65412 | 39.68 |
| 29 | 23.342 | 4.19 | | |
| 30 | −33.775 | 1.20 | 1.65412 | 39.68 |
| 31 | 2035.478 | Variable | | |
| 32 | 63.492 | 5.50 | 1.61800 | 63.40 |
| 33 | −74.154 | 1.70 | | |
| 34 | 71.428 | 5.09 | 1.72047 | 34.71 |
| 35 | −108.627 | Variable | | |
| Image plane | ∞ | | | |

Various data

| | Infinity | Close 1 | Close 2 |
|---|---|---|---|
| OB | ∞ | 178.9 | 115.0 |
| f | 88.20 | 99.85 | 94.66 |
| FNO. | 2.85 | 2.64 | 1.70 |
| NAin | | 0.063 | 0.091 |
| 2ω | 14.04 | 8.32 | 4.03 |
| BF (in air) | 28.17 | 28.17 | 28.17 |
| LTL (in air) | 150.02 | 150.02 | 150.02 |
| IH | 10.815 | | |
| βmax | −1.0 | | |
| IOnear | 265.02 | | |
| d8 | 4.53 | 10.14 | 16.69 |
| d14 | 19.80 | 14.25 | 7.80 |
| d17 | 20.80 | 11.25 | 2.80 |
| d23 | 6.04 | 15.53 | 23.88 |
| d25 | 3.66 | 3.66 | 3.66 |
| d31 | 2.50 | 2.50 | 2.50 |
| d35 | 28.17 | 28.17 | 28.17 |

Unit focal length

| | | | |
|---|---|---|---|
| f1 = 45.30 | f2 = −25.03 | f3 = 185.42 | f4 = 37.08 |
| f5 = −70.19 | 6 = −26.61 | f7 = 30.38 | |

Next, values of conditional expressions in each example are given below.

| | Example 1 | Example 2 |
|---|---|---|
| (1) |LEE/Δfo1G| | 8.76 | 10.02 |
| (2) |LEE/Δfo2G| | 7.61 | 6.83 |
| (3) |MG| | 1.00 | 1.00 |

Figure 5:
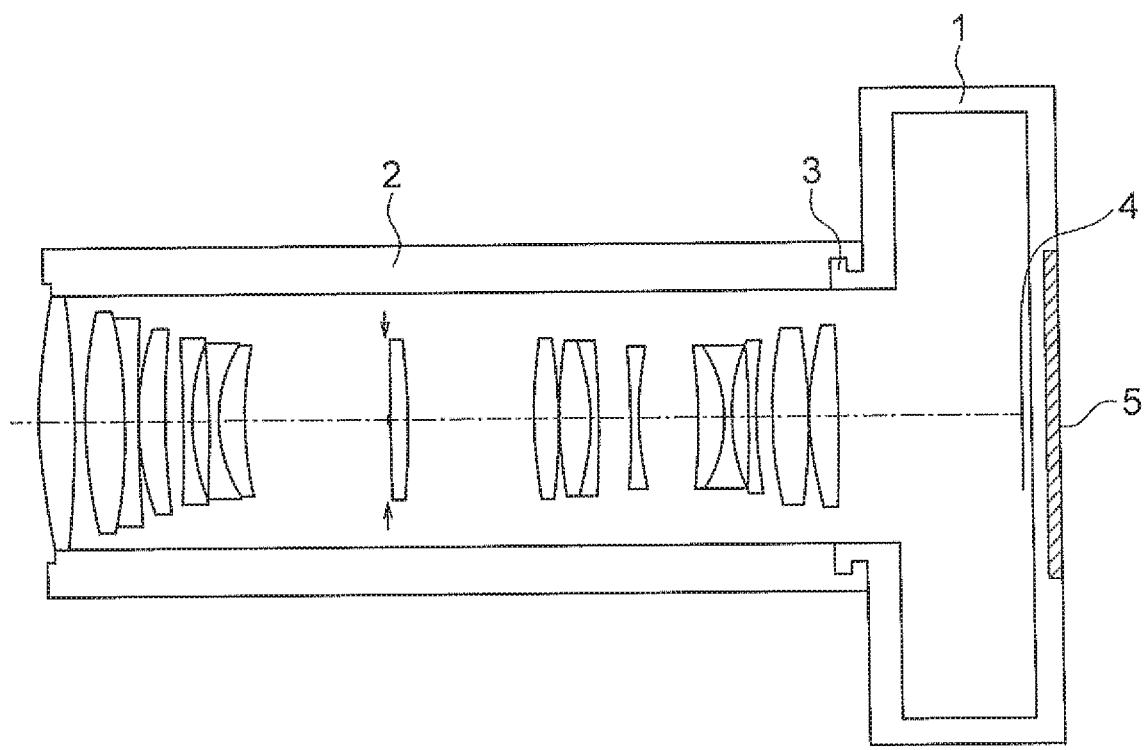
FIG. 5 is a cross-sectional view of an image pickup apparatus.

FIG. 5 is a cross-sectional view of a single-lens mirrorless camera as an electronic image pickup apparatus. In FIG. 5, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the macro lens described in any one of the examples is used.

Figure 6:
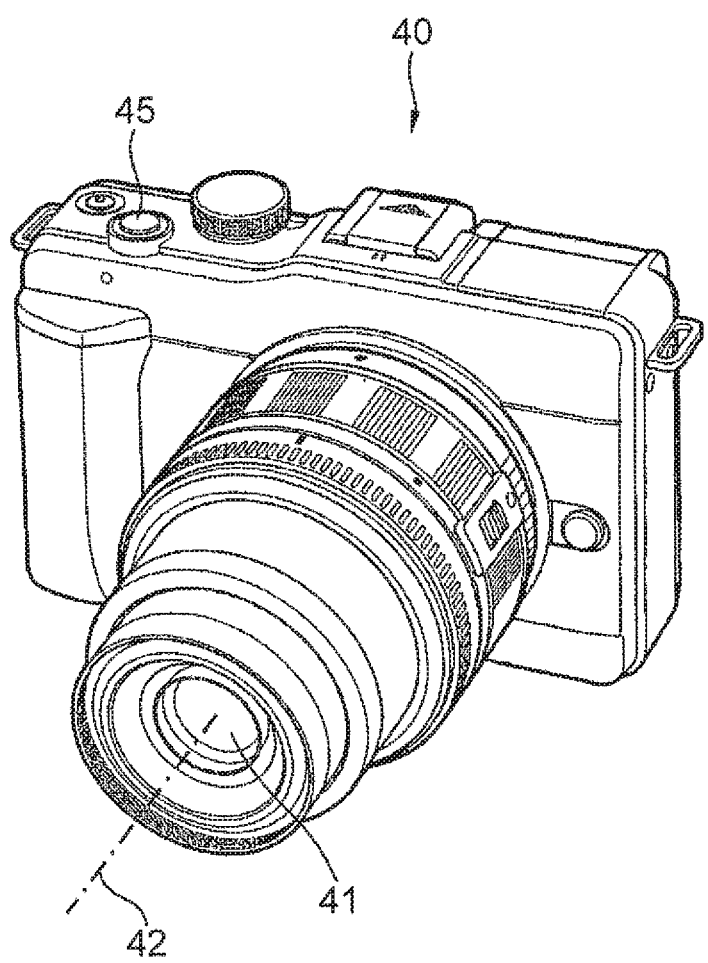
FIG. 6 is a front perspective view of the image pickup apparatus.
Figure 7:
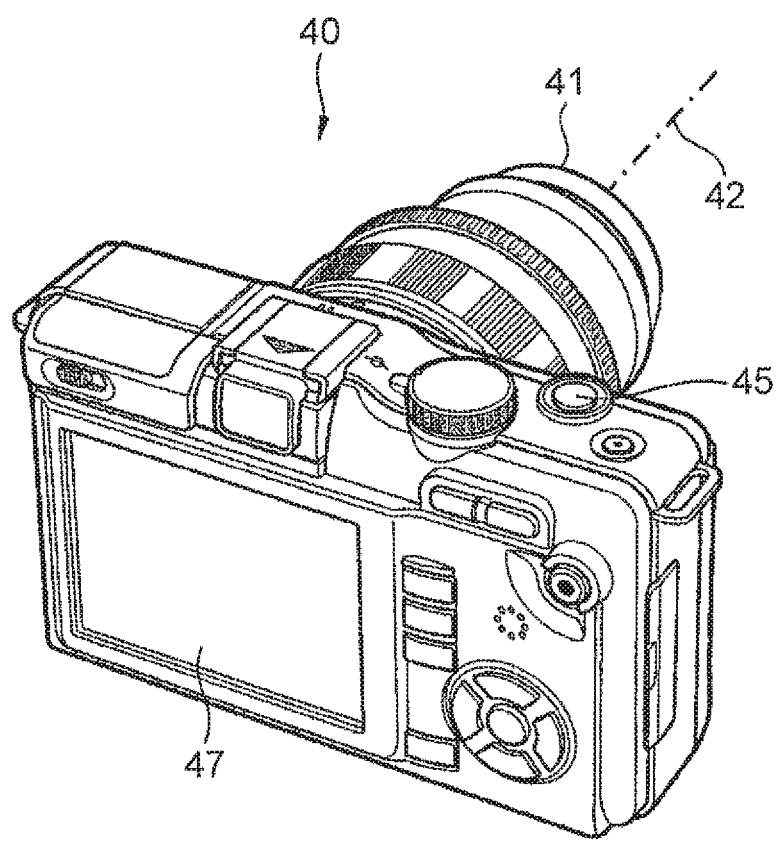
FIG. 7 is a rear perspective view of the image pickup apparatus.
Figure 8:
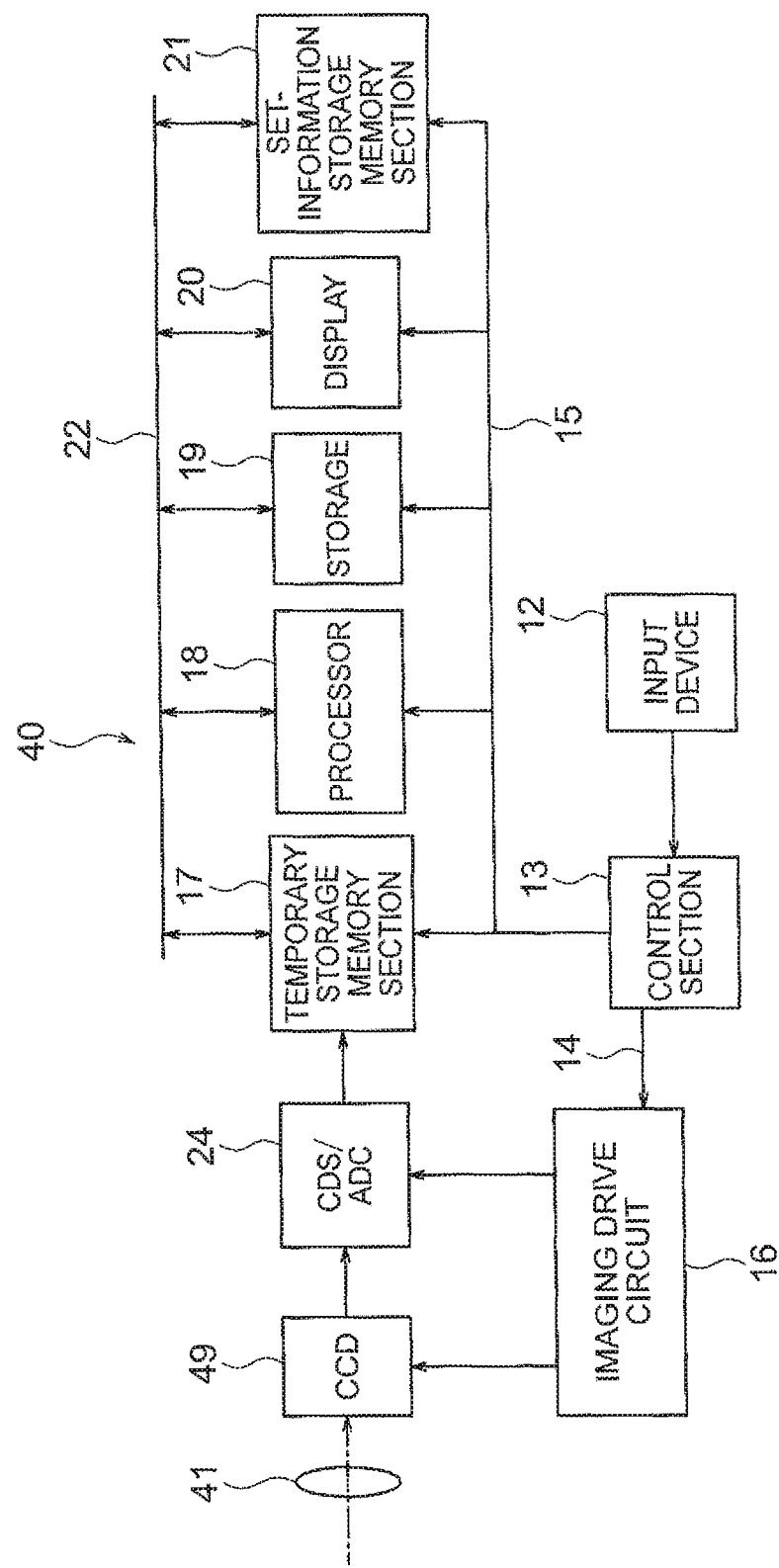
FIG. 8 is a structural block diagram of an internal circuit of main components of the image pickup apparatus.

FIG. 6 and FIG. 7 are conceptual diagrams of an arrangement of the image pickup apparatus. FIG. 6 is a front perspective view of a digital camera 40 as the image pickup apparatus, and FIG. 7 is a rear perspective view of the digital camera 40. The macro lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the macro lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

FIG. 9 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 9, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the single-lens mirrorless camera 40 in which such an arrangement is made, by adopting the macro lens according to the present invention as the photographing optical system 41, it is possible to capture an image in a wide photography range with low noise at high resolution. Moreover, it is possible to use the macro lens according to the present invention in an image pickup apparatus of a type having a quick-return mirror.

The present invention can have various modified examples without departing from the scope of the invention. Moreover, shapes of lenses and the number of lenses are not necessarily restricted to the shapes and the number of lenses indicated in the examples. Moreover, a lens that is not shown in the diagrams of the examples described above, and that does not have a refractive power practically may be disposed in a lens unit or outside the lens unit.

According to the present embodiment, it is possible to provide a macro lens which has a small aberration fluctuation and a high imaging performance, and an image pickup apparatus using the macro lens.

As described heretofore, the present invention is suitable for a macro lens which has a small aberration fluctuation and a high imaging performance.

What is claimed is:

1. A macro lens, comprising:
an object-side lens unit having a positive refractive power;
a first focusing lens unit having a negative refractive power;
a second focusing lens unit having a positive refractive power;
an aperture stop which restricts an axial light beam;
an intermediate lens unit which includes a lens component having a positive refractive power; and
a wobbling lens unit which includes a single lens having a negative refractive power;
wherein:
the object-side lens unit is disposed nearest to an object,
the first focusing lens unit is disposed on an image side of the object-side lens unit,
the second focusing lens unit is disposed on an image side of the first focusing lens unit,
the aperture stop and the intermediate lens unit are disposed between the first focusing lens unit and the second focusing lens unit,
the aperture stop is adjacent to the lens component having a positive refractive power, at a time of focusing, a position of each of the object-side lens unit, the aperture stop, and the intermediate lens unit is fixed, in the first focusing lens unit, a position at a time of focusing to an object at a close distance is located on an image side with respect to a position at a time of focusing to an object at the longest distance, in the second focusing lens unit, a position at the time of focusing to an object at a close distance is located on an object side with respect to a position at the time of focusing to an object at the longest distance, and the following conditional expressions (1), (2), and (3) are satisfied:

$$2 < LEE/|\Delta fo1G| < 15 \tag{1}$$

$$2 < LEE/|\Delta fo2G| < 15 \tag{2}$$

$$0.5 < |MG| < 1.5 \tag{3}$$

where, the lens component having a positive refractive power has only two air-contact surfaces, $\Delta fo1G$ denotes a predetermined difference in the first focusing lens unit, $\Delta fo2G$ denotes a predetermined difference in the second focusing lens unit, LEE denotes a distance from a lens surface nearest to the object of the macro lens up to a lens surface nearest to an image of the macro lens at the time of focusing to an object at the longest distance, and MG denotes a photographic magnification at a close photographic distance, and here the predetermined difference is a difference between the position at the time of focusing to an object at the longest distance and the position at the time of focusing to an object at a close distance.

2. The macro lens according to claim 1, wherein the wobbling lens unit has a negative refractive power.

3. The macro lens according to claim 1, wherein the wobbling lens unit is disposed on an image side of the second focusing lens unit.

4. The macro lens according to claim 1, wherein the object-side lens includes, in order from an object side, a single lens having a positive refractive power, a single lens having a positive refractive power, a single lens having a negative refractive power, and a single lens having a positive refractive power.

5. The macro lens according to claim 1, wherein:
the first focusing lens unit includes, in order from an object side, a single lens having a negative refractive power and a cemented lens, and
the cemented lens includes a single lens having a negative refractive power and a single lens having a positive refractive power.

6. The macro lens according to claim 1, wherein:
the second focusing lens includes, in order from an object side, a single lens having a positive refractive power and a cemented lens, and
the cemented lens includes a single lens having a positive refractive power and a single lens having a negative refractive power.

7. An image pickup apparatus, comprising:
an optical system; and
an image pickup element which has an image pickup surface, and which converts an image formed on the image pickup surface by the optical system to an electric signal, wherein the optical system is the macro lens according to claim 1.

8. A macro lens, comprising:
an object-side lens unit having a positive refractive power;
a first focusing lens unit having a negative refractive power;
a second focusing lens unit having a positive refractive power;
an aperture stop which restricts an axial light beam;
an intermediate lens unit which includes a lens component having a positive refractive power; and
a wobbling lens unit,
wherein:
the object-side lens unit is disposed nearest to an object,
the first focusing lens unit is disposed on an image side of the object-side lens unit,
the second focusing lens unit is disposed on an image side of the first focusing lens unit,
the aperture stop and the intermediate lens unit are disposed between the first focusing lens unit and the second focusing lens unit,
the aperture stop is adjacent to the lens component having a positive refractive power,
at a time of focusing, a position of each of the object-side lens unit, the aperture stop, and the intermediate lens unit is fixed,
in the first focusing lens unit, a position at a time of focusing to an object at a close distance is located on an image side with respect to a position at a time of focusing to an object at the longest distance,
in the second focusing lens unit, a position at the time of focusing to an object at a close distance is located on an object side with respect to a position at the time of focusing to an object at the longest distance, and
the following conditional expressions (1), (2), (3), and (4) are satisfied:

$$2 < LEE/|\Delta fo1G| < 15 \tag{1}$$

$$2 < LEE/|\Delta fo2G| < 15 \tag{2}$$

$$0.5 < |MG| < 1.5 \tag{3}$$

$$0 < Dw/FLinf < 0.017 \tag{4}$$

where, the lens component having a positive refractive power has only two air-contact surfaces, $\Delta fo1G$ denotes a predetermined difference in the first focusing lens unit, $\Delta fo2G$ denotes a predetermined difference in the second focusing lens unit, LEE denotes a distance from a lens surface nearest to the object of the macro lens up to a lens surface nearest to an image of the macro lens at the time of focusing to an object at the longest distance, MG denotes a photographic magnification at a close photographic distance, Dw denotes a thickness of the wobbling lens unit on an optical axial, and FLinf denotes a focal length of the macro lens at the time of focusing to an object at the longest distance, and here the predetermined difference is a difference between the position at the time of focusing to an object at the longest distance and the position at the time of focusing to an object at a close distance.

9. The macro lens according to claim 8, wherein the wobbling lens unit includes a single lens having a negative refractive power.

10. A macro lens, comprising:
an object-side lens unit having a positive refractive power;
a first focusing lens unit having a negative refractive power;
a second focusing lens unit having a positive refractive power;
an aperture stop which restricts an axial light beam;
an intermediate lens unit which includes a lens component having a positive refractive power; and
a wobbling lens unit,
wherein:
the object-side lens unit is disposed nearest to an object,
the first focusing lens unit is disposed on an image side of the object-side lens unit,
the second focusing lens unit is disposed on an image side of the first focusing lens unit,
the aperture stop and the intermediate lens unit are disposed between the first focusing lens unit and the second focusing lens unit,
the aperture stop is adjacent to the lens component having a positive refractive power,
at a time of focusing, a position of each of the object-side lens unit, the aperture stop, and the intermediate lens unit is fixed,
in the first focusing lens unit, a position at a time of focusing to an object at a close distance is located on an image side with respect to a position at a time of focusing to an object at the longest distance,
in the second focusing lens unit, a position at the time of focusing to an object at a close distance is located on an object side with respect to a position at the time of focusing to an object at the longest distance, and
the following conditional expressions (1), (2), (3), and (5) are satisfied:

$$2 < LEE/|\Delta fo1G| < 15 \quad (1)$$

$$2 < LEE/|\Delta fo2G| < 15 \quad (2)$$

$$0.5 < |MG| < 1.5 \quad (3)$$

$$1.82 < FLap/FLinf < 2.17 \quad (5)$$

where,
the lens component having a positive refractive power has only two air-contact surfaces,
$\Delta fo1G$ denotes a predetermined difference in the first focusing lens unit,
$\Delta fo2G$ denotes a predetermined difference in the second focusing lens unit,
LEE denotes a distance from a lens surface nearest to the object of the macro lens up to a lens surface nearest to an image of the macro lens at the time of focusing to an object at the longest distance,
MG denotes a photographic magnification at a close photographic distance,
FLap denotes a focal length of the intermediate lens unit, and
FLinf denotes a focal length of the macro lens at the time of focusing to an object at the longest distance, and here
the predetermined difference is a difference between the position at the time of focusing to an object at the longest distance and the position at the time of focusing to an object at a close distance.

11. A macro lens, comprising:
an object-side lens unit having a positive refractive power;
a first focusing lens unit having a negative refractive power;
a second focusing lens unit having a positive refractive power;
an aperture stop which restricts an axial light beam;
an intermediate lens unit which includes a lens component having a positive refractive power;
a wobbling lens unit; and
a motion blur correction lens unit having a negative refractive power, the motion blur correction lens unit being disposed on an image side of the wobbling lens unit;
wherein:
the object-side lens unit is disposed nearest to an object,
the first focusing lens unit is disposed on an image side of the object-side lens unit,
the second focusing lens unit is disposed on an image side of the first focusing lens unit,
the aperture stop and the intermediate lens unit are disposed between the first focusing lens unit and the second focusing lens unit,
the aperture stop is adjacent to the lens component having a positive refractive power,
at a time of focusing, a position of each of the object-side lens unit, the aperture stop, and the intermediate lens unit is fixed,
in the first focusing lens unit, a position at a time of focusing to an object at a close distance is located on an image side with respect to a position at a time of focusing to an object at the longest distance,
in the second focusing lens unit, a position at the time of focusing to an object at a close distance is located on an object side with respect to a position at the time of focusing to an object at the longest distance, and
the following conditional expressions (1), (2), and (3) are satisfied:

$$2 < LEE/|\Delta fo1G| < 15 \quad (1)$$

$$2 < LEE/|\Delta fo2G| < 15 \quad (2)$$

$$0.5 < |MG| < 1.5 \quad (3)$$

where,
the lens component having a positive refractive power has only two air-contact surfaces,
$\Delta fo1G$ denotes a predetermined difference in the first focusing lens unit,
$\Delta fo2G$ denotes a predetermined difference in the second focusing lens unit,
LEE denotes a distance from a lens surface nearest to the object of the macro lens up to a lens surface nearest to an image of the macro lens at the time of focusing to an object at the longest distance, and
MG denotes a photographic magnification at a close photographic distance, and here
the predetermined difference is a difference between the position at the time of focusing to an object at the longest distance and the position at the time of focusing to an object at a close distance.

12. The macro lens according to claim 11, wherein:
the motion blur correction lens unit includes, in order from an object side, a cemented lens and a single lens having a negative refractive power, and the cemented lens includes a lens having a positive refractive power and a lens having a negative refractive power.

13. The macro lens according to claim 11, wherein:

an image-side lens unit is disposed on an image side of the motion blur correction lens unit, and the image-side lens unit includes two single lenses having a positive refractive power.

* * * * *